Patented Aug. 30, 1938

2,128,288

UNITED STATES PATENT OFFICE 2,128,288

MANUFACTURE OF ARTIFICIAL MATERIALS

Henry Dreyfus, London, England

No Drawing. Application September 5, 1935, Serial No. 39,286. In Great Britain September 11, 1934

4 Claims. (Cl. 8—13)

This invention relates to improvements in the manufacture of artificial materials, and particularly in the manufacture of artificial filaments, yarns and other materials containing cellulose acetate or other organic derivative of cellulose.

The incorporation of suitable agents in artificial materials containing organic derivatives of cellulose for various purposes, for example weighting, delustring and mordanting, is well-known and is described in numerous specifications. Thus, in my U. S. application S. No. 488,829, filed October 15th, 1930 I have described the manufacture of artificial materials by incorporating therein substantially colourless or white metallic organic compounds so that delustred, mordanted or weighted materials may be obtained. Again, U. S. Patents Nos. 1,806,048, 1,761,707 and 1,821,464 describe processes for weighting artificial materials by incorporating in them suitable inorganic compounds, for example phosphates and/or silicates of tin, zinc or aluminium. Other processes for loading, delustring and the like are described in U. S. application S. No. 34,638, filed August 3, 1935, corresponding to British application No. 24,983/34, filed August 30th, 1934, according to which water-insoluble substances are formed by reaction between substances contained in the materials and a gaseous acid, and in U. S. applications S. Nos. 37,779 and 37,780, filed August 24, 1935, corresponding to British applications Nos. 24,984/34 and 24,985/34 respectively both filed August 30th, 1934, which relate to the formation of water-insoluble mineral salts in textile and other materials by reaction between acids, particularly weak acids, or salts thereof and metallic compounds.

While the above processes yield very satisfactory results in general, it may happen, particularly when the materials contain high proportions of the agents, as in the case of loaded materials, that subsequent treatments, for example washing, may remove some of the agent, thus tending to change the character of the materials. It appears that in general the difficulty of preventing subsequent removal, e. g. by scouring, of the loading and other agents contained in the materials with which the present invention is concerned increases considerably with increase in the proportion of agent present in the materials, so that a permanent loading is much more difficult to obtain than, for example, a permanent delustring, which requires a much smaller proportion of agent. For this reason the process of the present invention is particularly concerned with, and is particularly valuable in relation to, the production of loaded materials.

I have now discovered that improved results may be obtained, particularly with respect to the permanence of the effect produced by the loading or other agent, by incorporating in the materials substantially water-insoluble salts of organic compounds of high molecular weight which contain acidic groups, for example water-insoluble salts of higher fatty acids, i. e. acids containing at least seven carbon atoms, and preferably twelve or more carbon atoms, of naphthenic acids, or of resins containing acid groups. The compounds may be substantially uniformly distributed throughout the materials, or may be confined mainly to the surface layers.

As examples of suitable compounds may be mentioned salts of heavy metals, for example lead, of the alkaline earths, for example barium and strontium, and of magnesium and lithium with colophony, with glyptal resins and other synthetic or semi-synthetic resins containing acid groups and with palmitic, stearic, lauric and myristic acids. Thus, lithium myristate, palmitate and stearate, strontium laurate, barium laurate and aluminium, calcium, magnesium and zinc resinates may be employed.

The permanence of the loading or other effects may also be improved by using, instead of the water-insoluble salts, insoluble resins themselves, which may either be applied ready formed to the materials, e. g. from solution in a suitable solvent, or be formed thereon, e. g. by reaction between suitable components or by polymerization. Thus, cellulose acetate filaments containing a loading agent may be treated with a benzene solution of ester gum, or an alcoholic solution of a phenol aldehyde resin. Preferably the compounds employed according to the present invention are substantially white or colourless and do not soften or decompose at temperatures to which the artificial materials are likely to be exposed, for example at temperatures up to about 220° to 260° C.

In general, it is necessary to incorporate in the materials only relatively small proportions of the compounds employed according to the present invention, for example, proportions of 1-2% up to about 5% of the weight of the materials. Higher proportions, for example, up to 10% or more may, however, be employed if desired.

The invention will now be described with reference to the incorporation of the water-insoluble salts, since this is the preferred method of carrying out the invention, but it will be understood that it also includes the incorporation of insoluble resins themselves.

The incorporation of the water-insoluble salts in the artificial materials may be effected after the incorporation of the loading or other agent or simultaneously therewith. Thus, the compounds may be incorporated by treating the materials with a solution of a suitable water-soluble salt of the compound, for example an ammonium salt, an alkali metal salt or a salt with an organic amine, or with a solution of the acid itself in a suitable solvent, and then converting the soluble compound or the acid into a water-insoluble metallic derivative by treatment with a compound of a suitable metal. Thus, artificial materials which have been weighted with aluminium silicate as described in the patents referred to above may be treated with an aqueous solution of sodium laurate and then with a solution of barium chloride so as to form the insoluble barium laurate. Again, the formation of the compounds employed according to the present invention may, as stated above, take place simultaneously with the incorporation of the inorganic compound. Thus, artificial filaments and the like may first be padded with a solution containing, for example, about 10% of sodium silicate and 2% of a salt of a suitable resin, higher fatty acid or similar compound and subsequently with barium chloride or other suitable salt, for example in a concentration of 5-10%, so that barium silicate and the barium salt of the resin or other compound are formed in the materials.

Again, as described in U. S. application S. No. 34,638 corresponding to British application No. 24,983/34, silica may be incorporated in artificial filaments by treating them first with a solution of sodium silicate and then with hydrogen chloride or other acid gas and the process may be combined with that of the present invention by incorporating the sodium salt of a suitable resin with the sodium silicate and then subjecting the materials, after the acid gas treatment, to the action of a solution of a suitable metallic compound, e. g. magnesium sulphate. When the process of the present invention is combined with that described in U. S. application S. No. 37,779 corresponding to British application No. 24,984/34 the resin, higher fatty acid or similar compound may be applied in the form of a water-soluble salt in an aqueous solution of a weak acid salt, e. g. sodium borate, and the water-insoluble salt of the organic compound may be formed simultaneously with the formation of the insoluble borate by treatment with a suitable compound, e. g. barium acetate. Again, materials containing metallic compounds may, as described in U. S. application S. No. 37,780 corresponding to British application No. 24,985/34, be treated with solutions of salts of weak acids to form insoluble metallic salts, and the solutions may also contain salts of higher fatty acids or other suitable compounds so that the water-insoluble salts of the present invention are simultaneously formed.

Particularly valuable filaments and other materials may be obtained by subjecting materials having a basis of an organic ester of cellulose to a saponification process, e. g. as described in U. S. applications S. Nos. 34,638, 37,779 and 37,780 corresponding to British applications Nos. 24,983/34, 24,984/34 and 24,985/34 respectively.

Incorporation of the water-insoluble compounds of the present invention may be assisted by swelling the materials, whether such incorporation takes place simultaneously with or subsequent to the formation of the loading or other agent. Among suitable agents for swelling materials having a basis of cellulose acetate or other organic derivative of cellulose are thiocyanates, e. g. ammonium thiocyanate, acetone, dioxane, methylene ethylene ether and acetic acid.

In the treatment of water-resistant materials, e. g. cellulose acetate, it may be advantageous to subject them to a wetting out treatment, in order to render them more amenable to subsequent treatment with aqueous liquids. The wetting medium may be water, but is preferably an aqueous solution of a suitable wetting agent, e. g. sodium oleate, Turkey red oil or other soap, an alkyl naphthalene sulphonic acid or an ω-aminoalkylamide of stearic or other fatty acid.

In general, incorporation of the compounds employed according to the present invention is facilitated by carrying out the treatment or treatments at raised temperatures, for example 40° C., 60° C. up to 80° C. or more. Further, the treatment or treatments may be carried out under pressure and for this purpose apparatus comprising "end chambers" such as is described in U. S. application S. No. 17,242 filed April 19th, 1935 is very suitable. If open baths are employed the evaporation of liquid media may be reduced by floating upon the surface of the bath a non-volatile water-insoluble oil, wax or the like as described in U. S. Patent No. 2,067,905.

For further details with regard to treatment with wetting or swelling agents reference is made to U. S. applications S. Nos. 34,638, 37,779 and 37,780 corresponding to British applications Nos. 24,983/34, 24,984/34 and 24,985/34 respectively, referred to above.

The process of the present invention may be carried out with fabrics or with yarns and like materials in hank or package form or during the travel of the materials from one point to another. Thus, artificial yarns may be passed first through a bath containing a suitable aluminium salt and preferably a suitable swelling agent, for example acetone in the case of cellulose acetate materials, and then into a bath containing sodium phosphate and a sodium salt of a higher fatty acid, for example sodium oleate or sodium stearate, so that aluminium phosphate and aluminium oleate or stearate are simultaneously formed in the materials. When artificial yarns are treated during the course of their travel from one point to another it is particularly advantageous to treat them in the form of a sheet of parallel yarns proceeding from a creel or other convenient source to a suitable collecting device, and, in this case, all rollers, guides or other devices controlling the direction and speed of the materials should extend across the whole of the sheet. In this way, all the yarns may be subjected to identical conditions, particularly with respect to tension.

As described in U. S. applications S. Nos. 34,638, 37,779 and 37,3780 corresponding to British applications Nos. 24,983/34, 24,984/34 and 24,985/34 respectively the materials treated may, at some stage in their manufacture, have undergone a stretching treatment, for example in the presence of steam or hot water as described in U. S. applications S. Nos. 4,510 and 4,511 both filed February 1st, 1935, or during their production by wet spinning processes. Further, as also is described in the above specifications, the materials may be subjected to a shrinking treatment, for example with solutions of latent solvents dissolved in water-immiscible diluents as described in U. S. Patent No. 2,058,422. Preferably a shrinking treatment is effected before the formation of the water-insoluble compounds employed according to the present invention. For example, yarns or other materials may be loaded by any suitable process, may then be subjected to a shrinking operation, for example with a shrinking medium containing methylene chloride and may then be treated in order to incorporate therein a water-insoluble compound of the character employed according to the present invention.

The present invention may also be employed in the production of yarns having a high twist which are suitable for the production of fabrics having a crêpe figure. Particularly valuable crêpe yarns may be obtained by carrying out the twisting operation in the presence of steam or hot water as described in U. S. applications S. Nos. 746,134, 746,135 both filed September 29th, 1934 and Patent No. 2,089,191. In this case also the twisting operation is preferably carried out before the incorporation of the compounds employed according to the present invention.

The following examples are given in order to illustrate the invention, but it is to be understood that they do not limit it in any way:—

*Example 1*

Hanks of cellulose acetate yarn are immersed in a 20% solution of sodium silicate containing about 2½% of sodium colophonate for about 2 minutes at 75°–85° C., the liquor being kept in motion during the immersion of the hanks. They are then withdrawn, excess liquor is removed until they contain about 100% of their weight of solution, after which they are dried and immersed for 2–3 minutes in a 20% solution of aluminium acetate at about 30° C. They are then removed, lightly centrifuged, rinsed and dried. In this manner a partially saponified yarn containing aluminium silicate and aluminium colophonate is obtained.

*Example 2*

A woven fabric made from cellulose acetate spun yarn is immersed for about 2 minutes at 75°–85° C. in a 20–25% solution of sodium silicate containing about 2% of sodium laurate. It is then removed and mangled until it retains an amount of liquor about equal to the original weight of the fabric, after which it is dried and immersed in a solution containing about 30% of barium chloride and 20–30% of acetic acid at 40° C. for 1–2 minutes. It is then removed, lightly washed and dried. In this manner a partially saponified yarn containing barium silicate and barium laurate is obtained.

*Example 3*

A number of cellulose acetate yarns in parallel formation are passed through a bath containing a 20–25% solution of aluminium acetate at about 40° C. and then through a bath containing about 20% of sodium silicate and 1–2% of sodium naphthenate, maintained at a temperature of 40°–60° C., the time of contact with each bath being of the order of 1–2 minutes. The yarns, after emerging from the second bath, are lightly washed and dried and a yarn containing aluminium silicate and aluminium naphthenate is thus obtained.

*Example 4*

A woven cellulose acetate fabric is immersed in a 20% solution of sodium silicate for about 2 minutes at 75°–85° C. and is then removed and excess liquid expressed until it retains about its own weight of solution. It is then dried and treated in a solution containing about 30% of barium chloride and about 20% of acetic acid at 35°–45° C. for about 30 seconds. The fabric is then removed, dried and immersed for about 2–5 minutes at 20°–25° C. in a 2% solution of polymerized vinyl acetate in benzene. The fabric is then removed and dried. A partially saponified loaded fabric is thus obtained.

The present invention is particularly valuable in relation to the treatment of artificial materials containing cellulose acetate, but it may also be employed in the treatment of materials containing other organic derivatives of cellulose, for example cellulose propionate, butyrate, nitro-acetate, acetate-propionate and other esters and mixed esters of cellulose, ethyl cellulose acetate, oxy-ethyl cellulose acetate and other cellulose ether esters and methyl, ethyl, propyl, butyl and benzyl celluloses and other cellulose ethers. Further, it may also be employed in the treatment of other artificial materials, e. g. materials having a basis of regenerated cellulose obtained by the viscose process.

What I claim and desire to secure by Letters Patent is:—

1. Process for the treatment of artificial filaments, yarns, fabrics and other materials having a basis of organic derivatives of cellulose, which comprises treating the materials with a salt of a weak acid and a salt of an acid selected from the group consisting of resin acids and naphthenic acids, and subsequently treating the materials with a solution of a weighting metallic compound which reacts with said salts to form in the materials substantially water-insoluble salts of the said weak acid and of the said acid selected from the group consisting of resin acids and naphthenic acids, the resulting insoluble salts of said resin and naphthenic acids being adapted to increase the permanence of the weighting effect produced in the materials.

2. Process for the treatment of artificial filaments, yarns, fabrics and other materials having a basis of organic derivatives of cellulose, which comprises treating the materials with a solution of a weighting metallic compound, and subsequently treating the materials with a solution of a salt of a weak acid and of a salt of an acid selected from the group consisting of resin acids and naphthenic acids so as to form in the materials substantially water-insoluble metal salts of the said weak acid and of the said acid selected from the group consisting of resin acids and naphthenic acids, the resulting insoluble salts of said resin and naphthenic acids being adapted to increase the permanence of the weighting effect produced in the materials.

3. Process for the treatment of artificial filaments, yarns, fabrics and other materials having a basis of an organic ester of cellulose, which comprises treating the materials successively with a solution comprising a salt of a weak acid and a salt of a resin acid and with a solution of a weighting metallic compound which reacts with the said salts to form in the materials substantially water-insoluble salts of the said weak acid and of the said resin acid, the application of the solution of the salt of the weak acid being effected under such conditions that saponification of the cellulose ester materials is effected.

4. Process for the treatment of artificial filaments, yarns, fabrics and other materials having a basis of an organic ester of cellulose, which comprises treating the materials successively with a solution comprising a salt of a weak acid and a salt of a naphthenic acid and with a solution of a weighting metallic compound which reacts with the said salts to form in the materials substantially water-insoluble salts of the said weak acid and of the said naphthenic acid, the application of the solution of the salt of the weak acid being effected under such conditions that saponification of the cellulose ester materials is effected.

HENRY DREYFUS.